(12) United States Patent
Brueck et al.

(10) Patent No.: US 11,695,312 B2
(45) Date of Patent: Jul. 4, 2023

(54) ELECTROSTATIC DISCHARGE DISSIPATION STRUCTURE

(71) Applicant: MILWAUKEE ELECTRIC TOOL CORPORATION, Brookfield, WI (US)

(72) Inventors: Daniel J. Brueck, South Milwaukee, WI (US); Daniel R. Ertl, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 485 days.

(21) Appl. No.: 16/121,286

(22) Filed: Sep. 4, 2018

(65) Prior Publication Data

US 2019/0075639 A1    Mar. 7, 2019

Related U.S. Application Data

(60) Provisional application No. 62/553,433, filed on Sep. 1, 2017.

(51) Int. Cl.
*H02K 11/40* (2016.01)
*F04D 25/08* (2006.01)
(Continued)

(52) U.S. Cl.
CPC ......... *H02K 11/40* (2016.01); *F04D 25/0673* (2013.01); *F04D 25/0693* (2013.01); *F04D 25/08* (2013.01); *H02K 7/145* (2013.01); *H02K 9/06* (2013.01); *H02K 7/003* (2013.01); *H02K 7/086* (2013.01); *H05F 3/02* (2013.01)

(58) Field of Classification Search
CPC .... F04D 25/06; F04D 25/064; F04D 25/0673; F04D 25/0693; F04D 25/08; H02K 5/00; H02K 5/02; H02K 5/04; H02K 5/08; H02K 5/16–1737; H02K 5/22; H02K 7/00; H02K 7/08; H02K 7/083; H02K 7/085;
(Continued)

(56) References Cited

U.S. PATENT DOCUMENTS 4,223,419 A   9/1980  Sato et al.
5,083,340 A   1/1992  Takahashi et al.
(Continued)

FOREIGN PATENT DOCUMENTS

CN    104746459    *  7/2015  ............... E01H 1/08
CN    104746459 A     7/2015
(Continued)

OTHER PUBLICATIONS

CN 104746459 translation (Year: 2020).*
controleng.com; Control Engineering _ Motor shaft grounding can enhance reliability in your), (Year: 2013).*

*Primary Examiner* — Kenneth J Hansen
*Assistant Examiner* — David N Brandt
(74) *Attorney, Agent, or Firm* — Michael Best & Friedrich LLP (57) ABSTRACT

An electric tool, a blower and a method of discharging electrostatic charge in an electric tool. The tool may include a housing, a motor supported by the housing and powered by a power source, the motor including a rotor, a fan supported by the housing and driven by the motor to cause an air flow, and a wire electrically connected between the rotor and a terminal of the power source and operable to dissipate electrostatic discharge in the tool.

5 Claims, 12 Drawing Sheets

(51) Int. Cl.
  *F04D 25/06* (2006.01)
  *H02K 7/14* (2006.01)
  *H02K 9/06* (2006.01)
  *H02K 7/08* (2006.01)
  *H02K 7/00* (2006.01)
  *H05F 3/02* (2006.01)

(58) Field of Classification Search
  CPC .......... H02K 7/086; H02K 7/088; H02K 7/14; H02K 7/145; H02K 11/00; H02K 11/02
  See application file for complete search history.

(56) References Cited

U.S. PATENT DOCUMENTS

| | | |
|---|---|---|
| 5,149,160 A | 9/1992 | Iida et al. |
| 5,183,982 A | 2/1993 | Smith et al. |
| 5,233,946 A | 8/1993 | Yamami |
| 5,294,063 A | 3/1994 | Bote |
| 5,313,129 A * | 5/1994 | Stewart ................ H02K 5/1672 310/90 |
| 5,434,946 A | 7/1995 | Barzilai et al. |
| 5,806,133 A | 9/1998 | Iida |
| 5,926,910 A | 7/1999 | Nishimura et al. |
| 5,975,862 A | 11/1999 | Arahata et al. |
| 6,004,093 A | 12/1999 | Ishikawa |
| 6,077,033 A | 6/2000 | Ishikawa |
| 6,105,205 A | 8/2000 | Takahashi |
| 6,105,206 A | 8/2000 | Tokumaru et al. |
| 6,109,865 A | 8/2000 | Ishikawa |
| 6,141,823 A | 11/2000 | Fujiwara et al. |
| 6,253,415 B1 | 7/2001 | Honda |
| 6,468,053 B2 | 10/2002 | Wolpert |
| 6,718,651 B2 | 4/2004 | Perez et al. |
| 6,834,413 B2 | 12/2004 | Sanders et al. |
| 6,857,163 B2 | 2/2005 | Iida et al. |
| 7,055,213 B2 | 6/2006 | Iida et al. |
| 7,279,021 B2 | 10/2007 | Haberlein |
| 7,406,742 B2 | 8/2008 | Joos et al. |
| 7,472,454 B2 | 1/2009 | Hamm et al. |
| 7,685,673 B2 | 3/2010 | Kremsler et al. |
| 7,698,779 B2 | 4/2010 | Schliemann et al. |
| 7,707,684 B2 | 5/2010 | Hittmann et al. |
| 7,739,773 B2 | 6/2010 | Schliemann et al. |
| 7,945,991 B2 | 5/2011 | Hamm et al. |
| 8,042,220 B2 | 10/2011 | Hittmann et al. |
| 8,230,828 B2 | 7/2012 | Yoshino et al. |
| 8,789,237 B2 | 7/2014 | Hatano et al. |
| 8,806,705 B2 | 8/2014 | Minor et al. |
| 8,813,866 B2 | 8/2014 | Suzuki |
| 8,984,713 B2 | 3/2015 | Peterson |
| 9,057,166 B2 | 6/2015 | Prager |
| 9,083,269 B2 | 7/2015 | Eschenhagen et al. |
| 9,179,811 B2 | 11/2015 | Fukunaga et al. |
| 9,206,567 B2 | 12/2015 | Kinoshita et al. |
| 9,332,694 B2 | 10/2016 | Prager |
| 2001/0005482 A1 | 6/2001 | Wolpert |
| 2005/0133354 A1 | 6/2005 | Watanabe et al. |
| 2005/0210624 A1 | 9/2005 | Lammers et al. |
| 2006/0026788 A1 | 2/2006 | Fischer et al. |
| 2006/0137129 A1 | 6/2006 | Schroter |
| 2006/0179602 A1 | 8/2006 | Schliemann et al. |
| 2006/0219004 A1 * | 10/2006 | Forgue ................ F02M 37/0082 73/313 |
| 2007/0067947 A1 | 3/2007 | Hittmann et al. |
| 2008/0034533 A1 | 2/2008 | Hamm et al. |
| 2008/0209670 A1 | 9/2008 | Kemmerzell et al. |
| 2011/0000048 A1 * | 1/2011 | Yamazaki ................ F02B 63/06 15/412 |
| 2011/0247652 A1 | 10/2011 | Zimmer |
| 2013/0239357 A1 * | 9/2013 | Hoffman ................ E01H 1/08 242/400.1 |
| 2014/0140861 A1 | 5/2014 | Pellenc |
| 2014/0230181 A1 | 8/2014 | Yamaoka et al. |
| 2014/0234130 A1 | 8/2014 | Yamaoka et al. |
| 2015/0143657 A1 | 5/2015 | Gindele et al. |
| 2015/0237808 A1 | 8/2015 | Prager |
| 2015/0327352 A1 | 11/2015 | Kikuchi et al. |
| 2016/0029863 A1 | 2/2016 | Guo et al. |
| 2016/0296088 A1 | 10/2016 | Langhans et al. |
| 2016/0330913 A1 * | 11/2016 | Shao ................ F04D 29/545 |
| 2016/0345714 A1 | 12/2016 | Yamaoka et al. |

FOREIGN PATENT DOCUMENTS

| | | |
|---|---|---|
| CN | 205622961 U | 10/2016 |
| EP | 0587340 A1 | 3/1994 |
| EP | 0935943 B1 | 5/2007 |
| EP | 1728416 B1 | 11/2009 |
| EP | 1961357 B1 | 5/2010 |
| EP | 2444552 A1 | 4/2012 |
| EP | 2378940 B1 | 5/2013 |
| EP | 2589704 A2 | 5/2013 |
| EP | 2373839 B1 | 1/2015 |
| EP | 2328449 B1 | 3/2015 |
| EP | 2692220 B1 | 4/2016 |
| EP | 3106565 A2 | 12/2016 |
| WO | WO-2010018084 A1 | 2/2010 |

* cited by examiner

ELECTROSTATIC DISCHARGE DISSIPATION STRUCTURE

RELATED APPLICATION

The present application claims priority to U.S. Provisional Patent Application No. 62/553,433, filed Sep. 1, 2017, the entire contents of which are hereby incorporated by reference.

FIELD

The present invention relates to an electric tool and, more particularly, to electrostatic discharge dissipation structure for a tool.

SUMMARY

In one independent aspect, an electric tool, such as a blower, may generally include a housing; a motor supported by the housing and powered by a power source, the motor including a rotor; a fan supported by the housing and driven by the motor to cause an air flow; and structure (e.g., a wire) electrically connected between the rotor and a terminal of the power source and operable to dissipate electrostatic discharge in the tool.

In another independent aspect, a blower may generally include a housing including a motor support portion and a battery support portion, the housing defining a conduit; a motor supported by the motor support portion and powered by a battery supportable on the battery support portion, the motor including a rotor; a fan supported by the housing and driven by the motor to cause an air flow through the conduit; a circuit operable to electrically connect the battery to the motor, the circuit including a terminal connectable to a battery terminal; and electrostatic discharge structure operable to dissipate electrostatic discharge in the tool, the structure including a conductive interface engaging the rotor, and a conductor electrically connected between the conductive interface and the terminal.

In yet another independent aspect, a method of discharging electrostatic charge in an electric tool, such as a blower, may be provided. The tool may include a housing, a motor supported by the housing and powered by a power source, the motor including a rotor, and a fan supported by the housing and driven by the motor to cause an air flow. The method may generally include electrically connecting the rotor and a terminal of the power source; operating the fan; and dissipating electrostatic discharge in the tool.

Other independent features and independent aspects of the invention may become apparent by consideration of the following detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

FIGS. 1-5 illustrate an electric tool, such as a blower 10, including a housing assembly 14, a power unit 18, a blower fan assembly 22 driven by the power unit 18, and electrostatic discharge dissipation structure 26. During operation, electrostatic charge builds up in the blower 10, and the structure 26 is operable to dissipate this charge to inhibit damage to components of the blower 10 (e.g., electronic components), unwanted discharges to objects touching the blower 10, etc.

Figure 10:
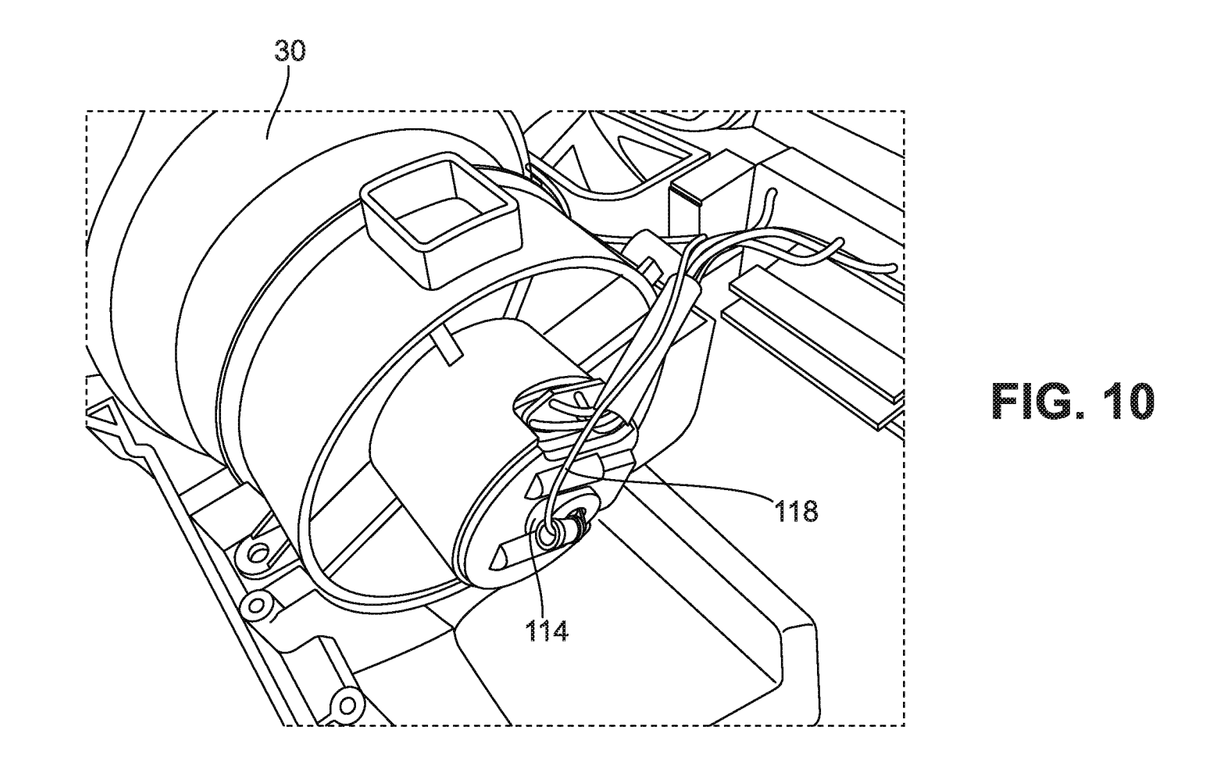
FIG. 10 is a perspective view of a portion of an electric tool, such as a blower.
Figure 11:
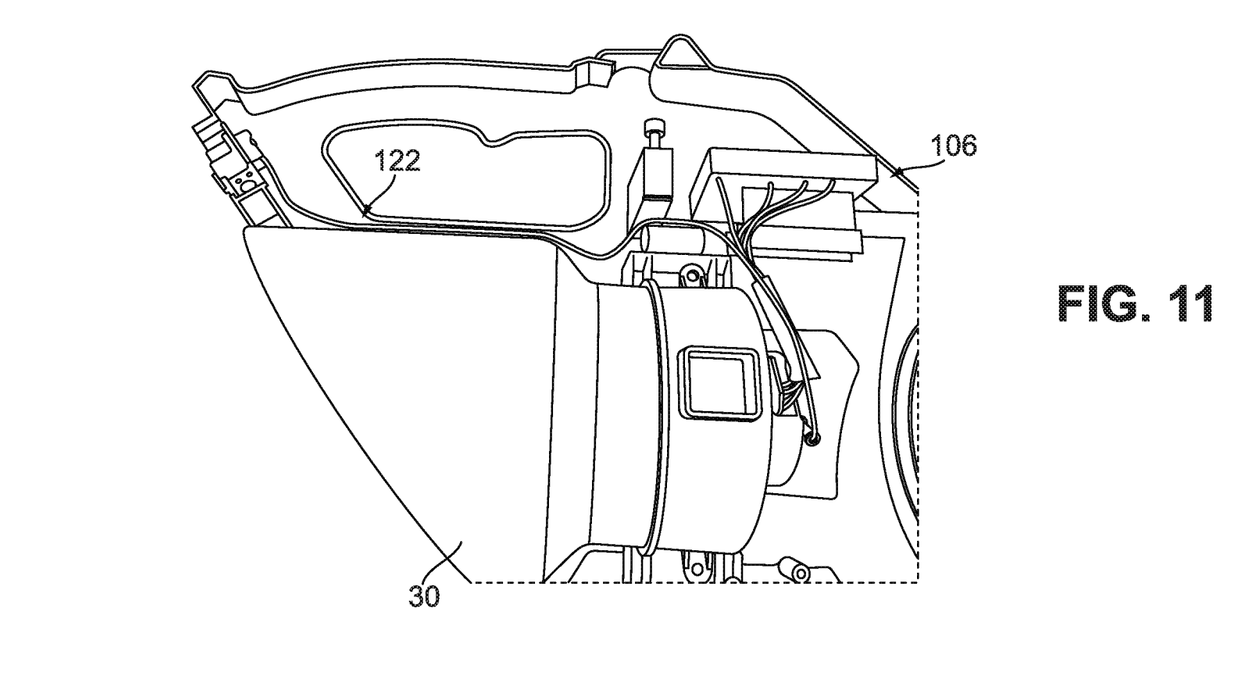
FIG. 11 is a side view of a portion of the blower shown in FIG. 10.

The housing assembly 14 includes a power unit support portion 30 (see FIGS. 10-11) and a duct member 34 (see FIG. 1) defining a flow path P to an outlet 38 from a housing inlet 42. The housing assembly 14 provides a power source connection portion 46 and a handle 50.

The power unit 18 includes a motor assembly 54 supported by the support portion 30 (e.g., a tubular member with fixed stator blades) in the flow path P. The motor assembly 54 includes a stator 58 supported by the support portion 30 and a rotor 62 supported by bearings 66. A drive shaft 70 is connected to the rotor 62. The fan assembly 22 includes a fan 74 with a hub 78 connected to the drive shaft 70 and blades 82 extending from the hub 78. The fan 74 is driven by the motor assembly 54 to create an air flow through the flow path P.

Figure 1:
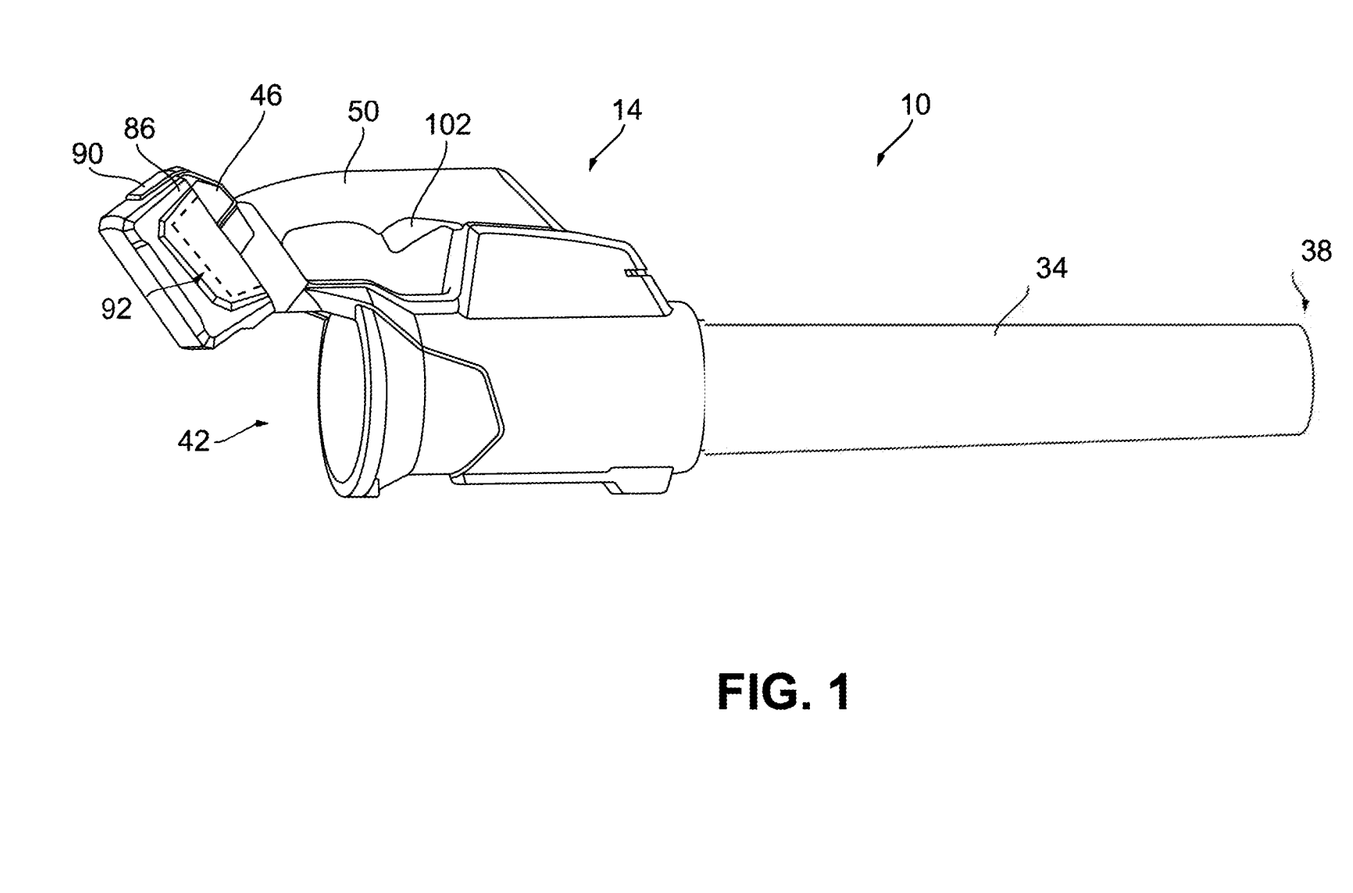
FIG. 1 is a side view of a tool, such as a blower.
Figure 2:
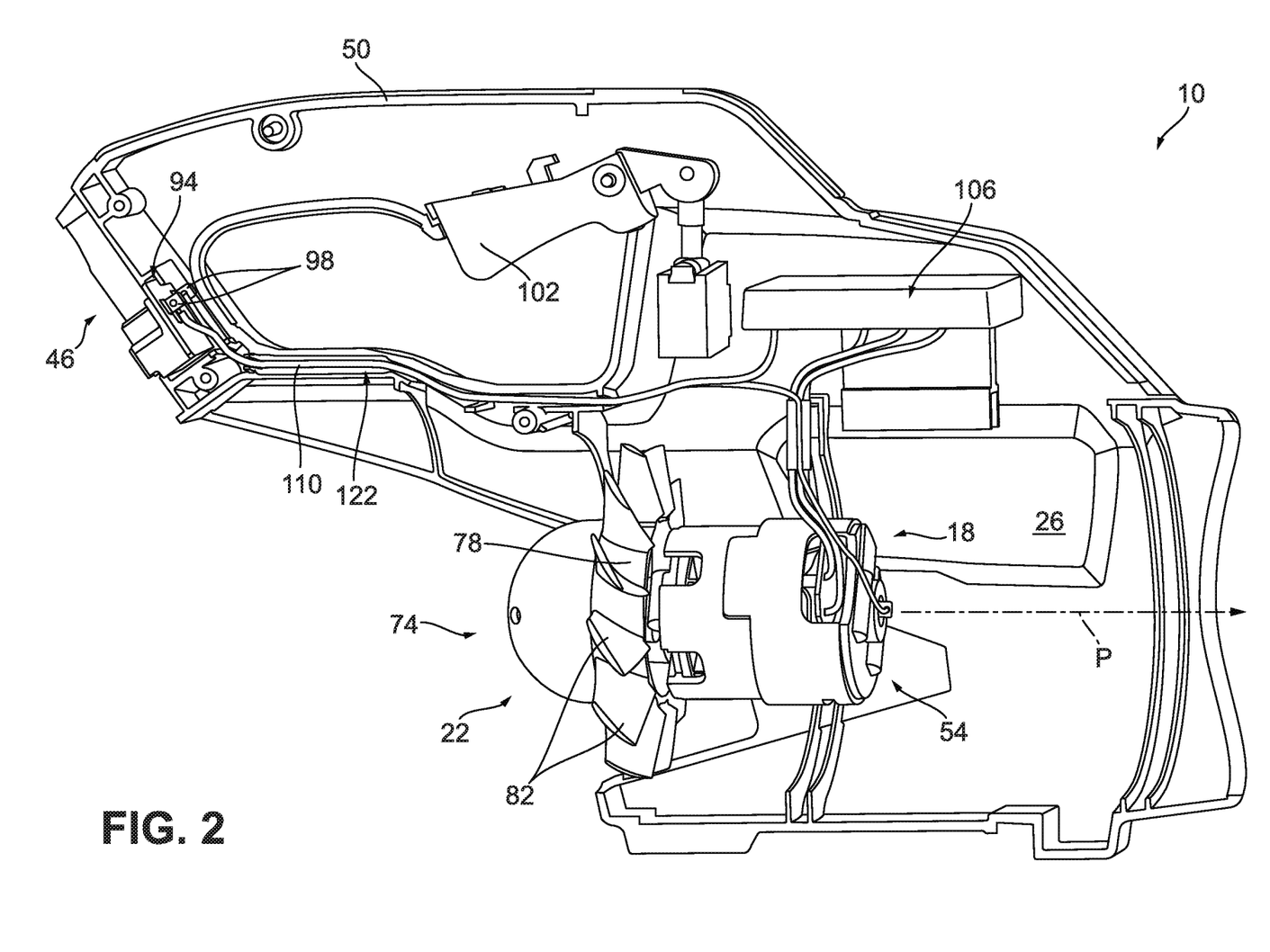
FIG. 2 is a side view of a portion of the blower of FIG. 1, with portions removed.
Figure 3:
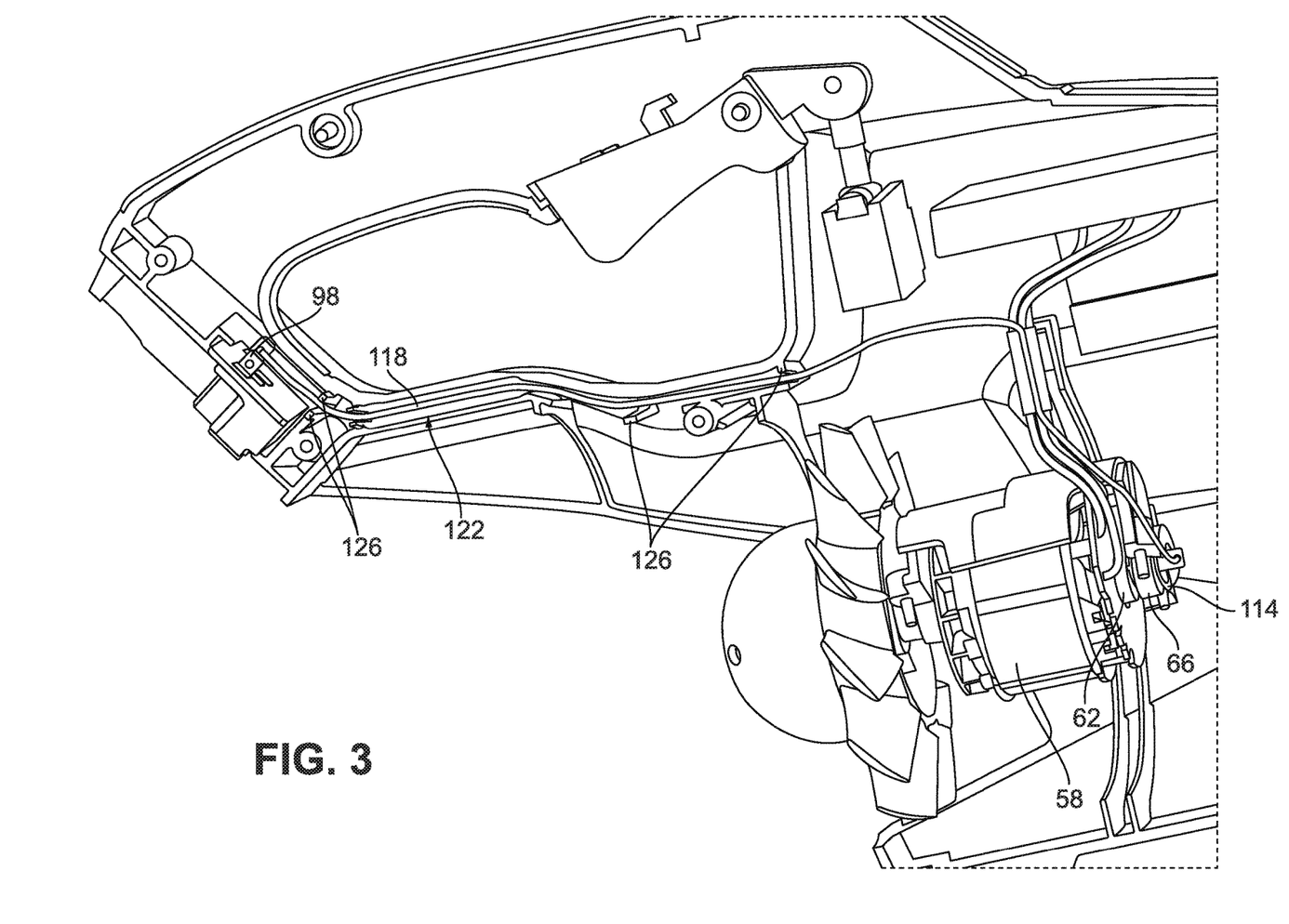
FIG. 3 is an enlarged view of a portion of the blower shown in FIG. 2.
Figure 4:
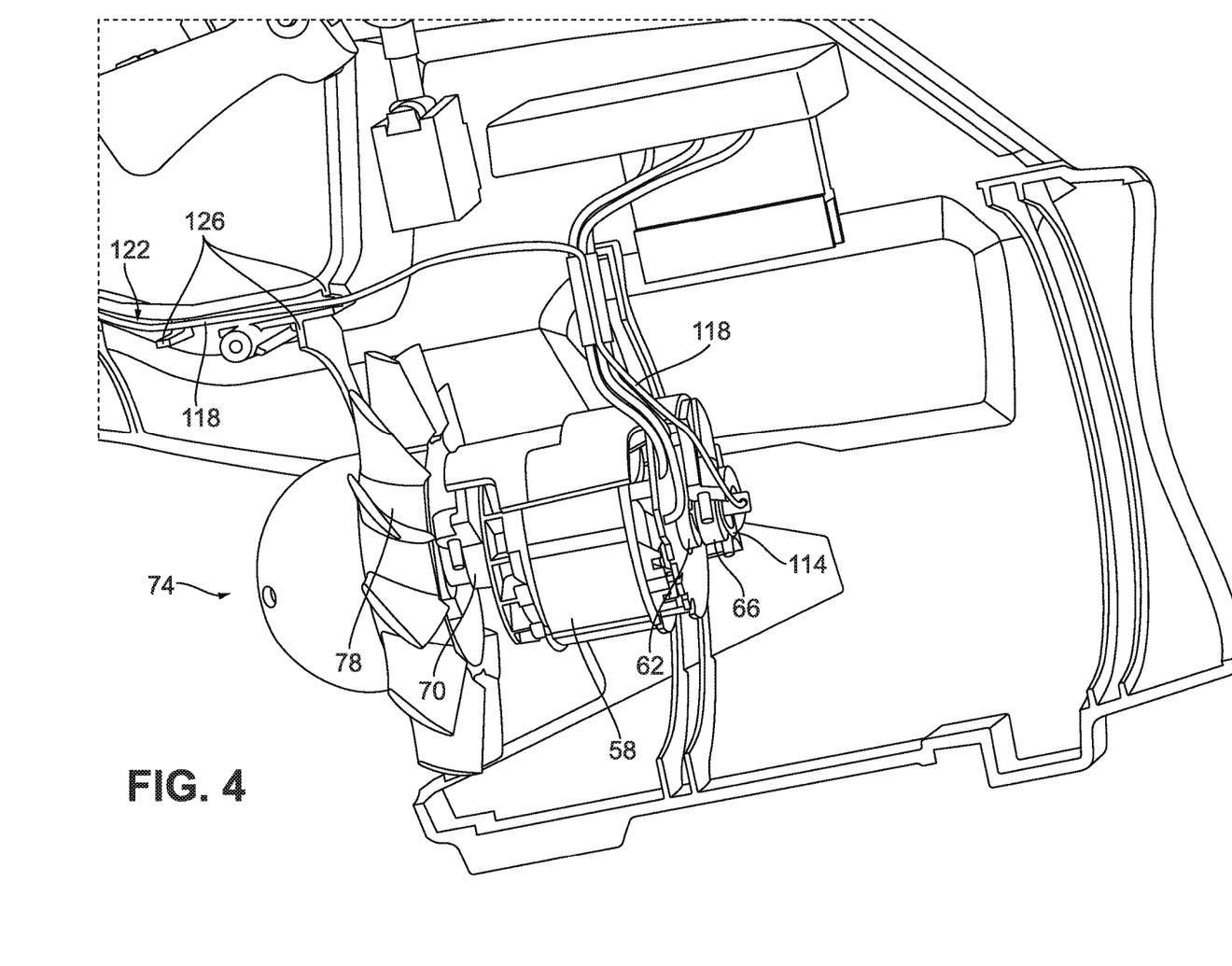
FIG. 4 is an enlarged view of another portion of the blower shown in FIG. 2.
Figure 5:
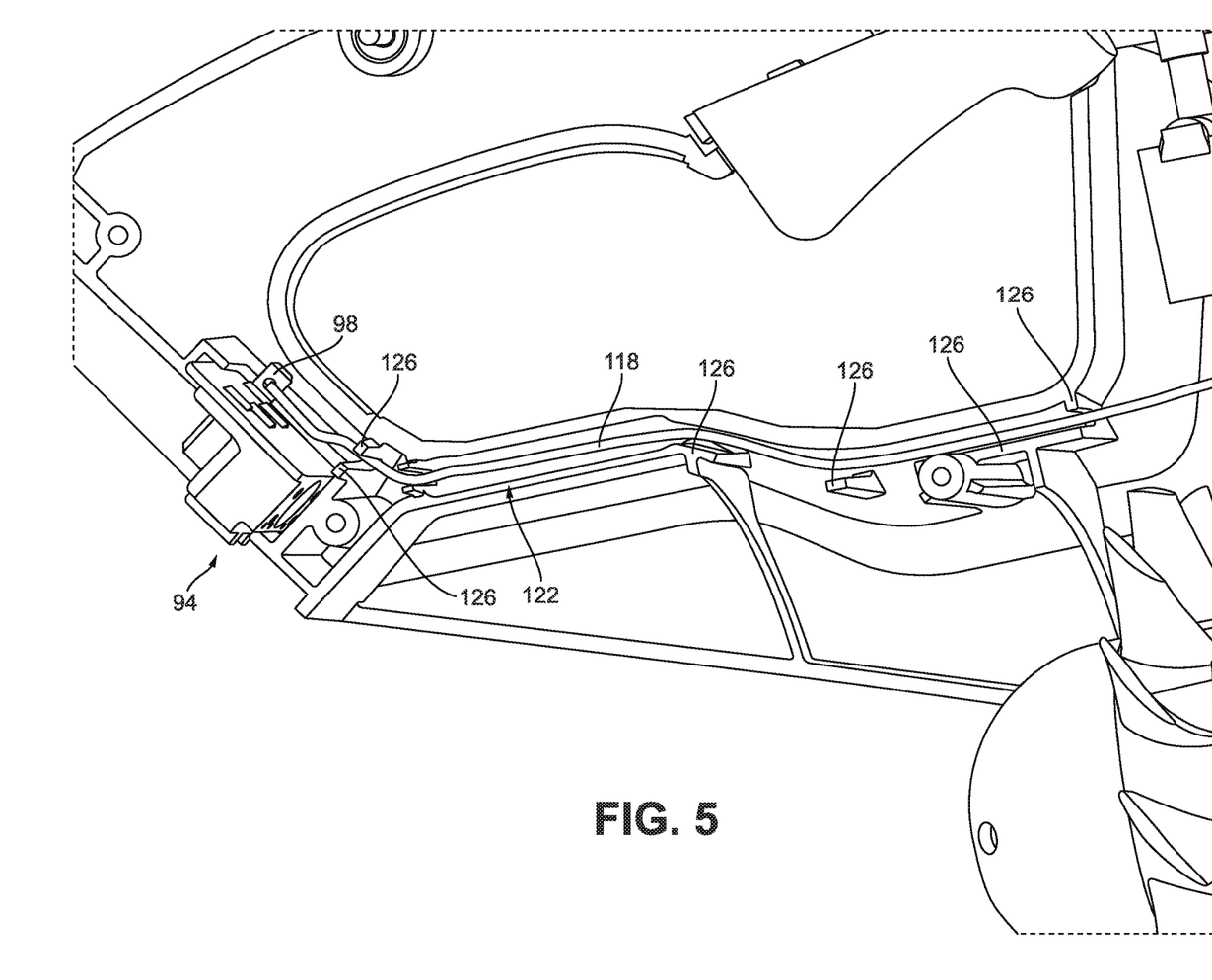
FIG. 5 is an enlarged view of another portion of the blower shown in FIG. 2.

The motor assembly 54 is powered by a power source. In the illustrated construction, the power source includes a battery pack 86 supportable on the connection portion 46. The battery pack 86 includes a pack housing 90 mechanically connected to the connection portion 46, one or more battery cells (not shown), and a battery terminal assembly 92 (FIG. 1). In other constructions (not shown), the power source may include a different power source (e.g., an AC power source).

An electrical circuit selectively connects the power source to the motor assembly 54. The circuit includes a terminal assembly 94 electrically connectable to the battery terminal assembly. The terminal assembly 94 includes at least power terminals 98 (e.g., positive and negative terminals). A switch assembly 102 (e.g., a user-actuated trigger supported on the handle 50) and a controller 106 cooperate to control operation of the blower 10 (e.g., supply of power to the motor assembly 54). The circuit includes a number of wires 110 electrically connecting the components.

Figure 6:
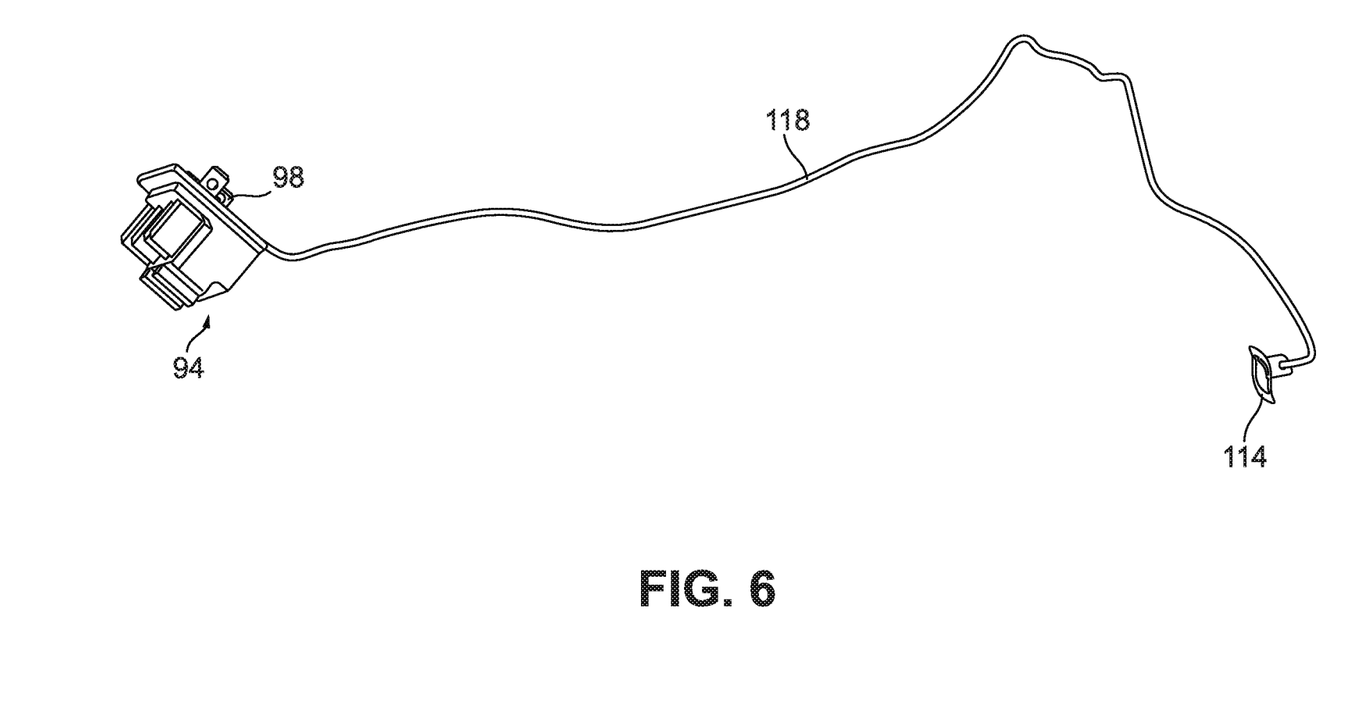
FIG. 6 is a perspective view of electrostatic discharge dissipation structure of the blower.

The electrostatic discharge dissipation structure 26 generally electrically connects a rotating portion of the power unit 18 to ground. In the illustrated construction, the structure 26 includes a conductive interface 114 (e.g., a washer, a plate, etc.) in electrical contact with the rotor 62 (through a bearing 66) and an electrical conductor (e.g., a wire 118) electrically connected between the conductive interface 114 and the terminal assembly 94 (e.g., to the negative power terminal 98).

Figure 7A:
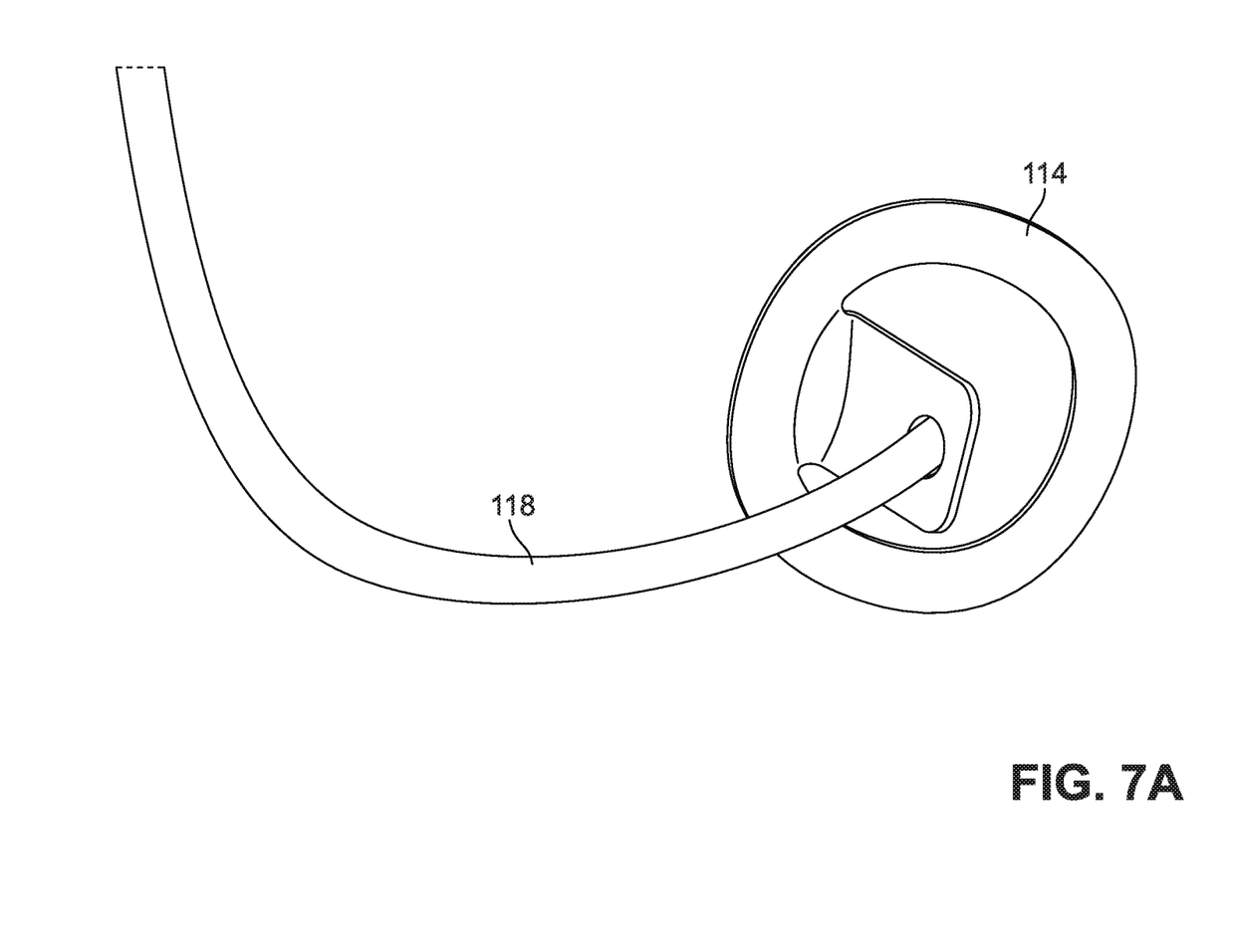
FIGS. 7A-7B are perspective views of the conductive interface of the structure shown in FIG. 6.
Figure 7B:
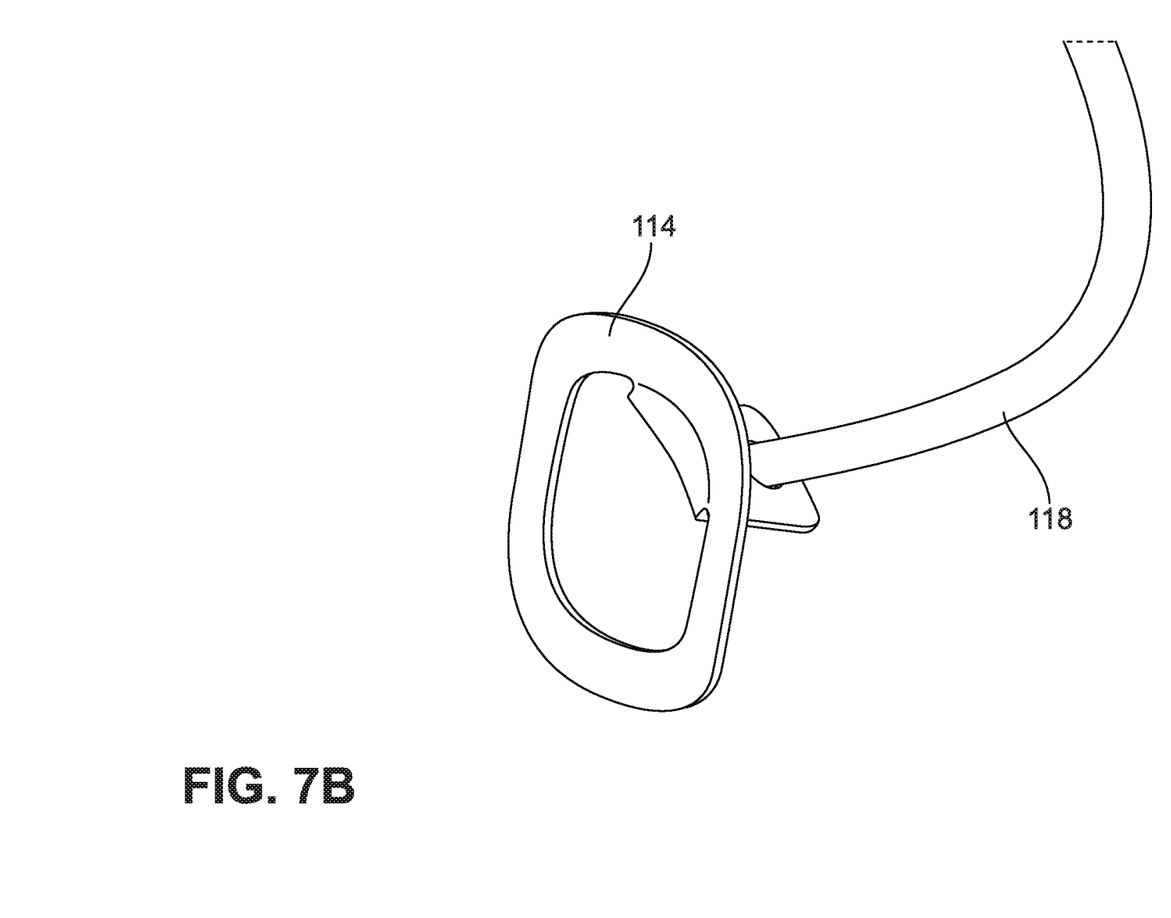
Figure 8:
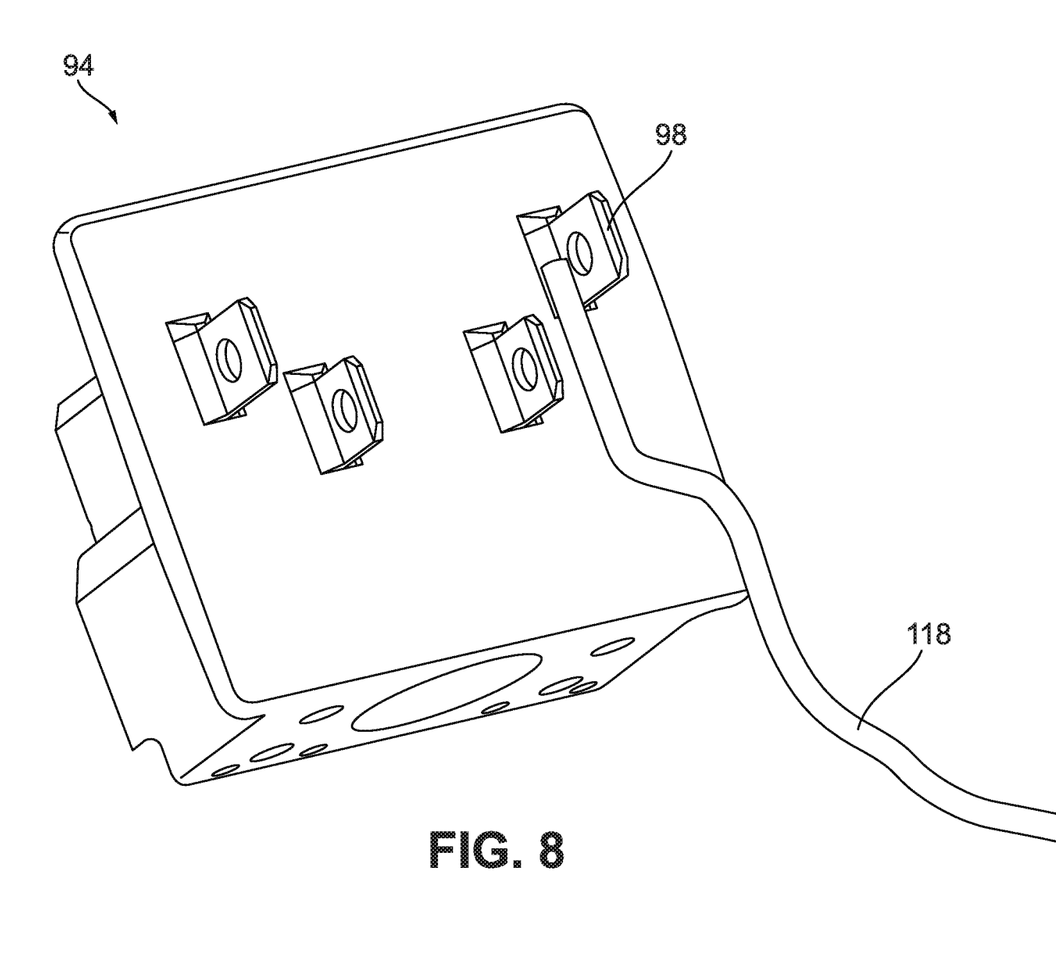
FIG. 8 is a perspective view of a terminal connection of the structure shown in FIG. 6.
Figure 9:
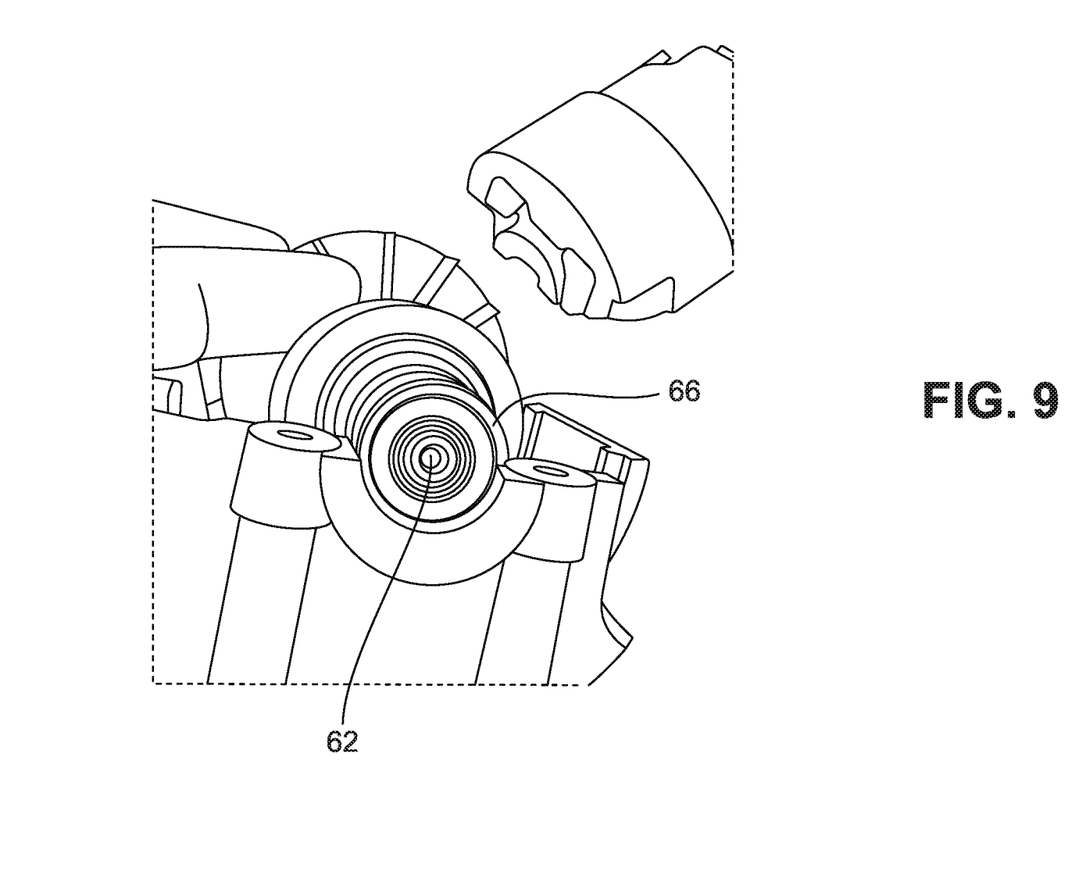
FIG. 9 is a perspective view of a portion of a motor assembly.

As shown in FIGS. 7A-7B, the conductive interface 114 includes an annular portion (e.g., extending about a full circumference (as illustrated), a portion of the circumference, etc.) engaging the bearing 66 (see FIG. 4) and a tab projecting from the annular portion. The wire 118 is connected to the tab.

The housing assembly 14 defines a wire path 122 for the wire 118 and at least some of the wires 110. The path 122 includes opposing retainer members 126 to retain the wires 118, 110 on the path 122. The path 122 is between the handle portion of the housing assembly 14 and the support portion 30.

In operation, the user holds the handle 50 and engages the switch assembly 102 to power the motor assembly 54 to drive the fan 74. Operation of the fan 74 generates a high velocity air flow and may cause electrostatic discharge to build up in the blower 10. The structure 26 dissipates the built-up charge to avoid unwanted discharges (e.g., to the electronics, to objects contacting the blower 10, etc.).

Although aspects of the invention have been described in detail with reference to certain preferred constructions, variations and modifications exist within the scope and spirit of one or more independent aspects of the invention as described.

One or more independent features and/or independent advantages of the invention may be set forth in the following claims:

What is claimed is:
1. A hand held blower comprising:
a housing assembly including a battery pack support portion, a handle including a user-actuated trigger, a motor support portion, and a duct member, the battery pack support portion operable to mechanically support a battery pack including a plurality of battery cells, the duct member defining a flow path to an outlet from a housing inlet;
a terminal assembly configured to electrically connect to the battery pack, the terminal assembly including a positive power terminal and a negative power terminal,
a motor supported by the motor support portion and powered by the battery pack, the motor including a rotor;
a blower fan assembly supported by the housing assembly and driven by the motor to cause an air flow in the flow path to the outlet; and
an electrostatic discharge dissipation structure including a conductive interface and a wire, the conductive interface in electrical contact with the rotor through a bearing, the wire electrically connected between the rotor and the negative power terminal of the terminal assembly, the wire operable to dissipate electrostatic discharge in the hand held blower, the conductive interface including a circumferentially extending annular portion and a tab including a through-hole and projecting perpendicularly from an inner circumference of the circumferentially extending annular portion, the circumferentially extending annular portion configured to engage the bearing, the wire connected to the tab;
wherein the housing defines a wire path for the wire between the motor support portion and the battery pack support portion, the wire path including retainer mem- bers configured to retain the wire on the wire path between the motor support portion and the battery pack support portion.

2. The hand held blower of claim 1, wherein the bearing is configured to support the rotor.

3. The hand held blower of claim 1, further comprising a circuit operable to electrically connect the battery pack to the motor.

4. The hand held blower of claim 1, wherein the motor includes a drive shaft connected to the rotor, and wherein the fan includes a hub and blades extending from the hub, the hub being coupled to the drive shaft.

5. The hand held blower of claim 1, further comprising a controller configured to control a supply of power to the motor.

* * * * *